Aug. 2, 1960 T. K. WOOD 2,947,115
APPARATUS FOR MANUFACTURING GLASS BEADS
Filed Dec. 1, 1955
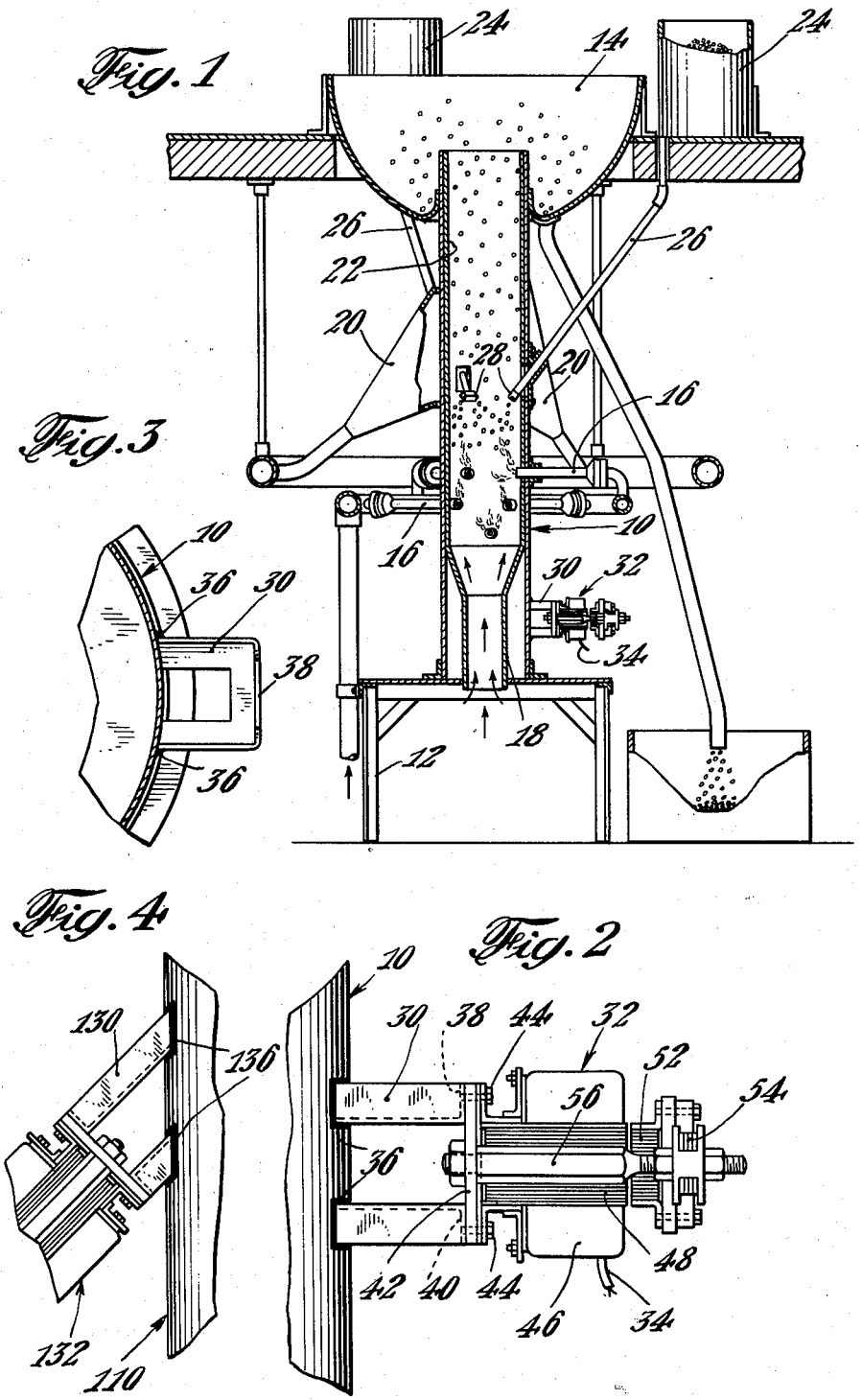

2,947,115
APPARATUS FOR MANUFACTURING GLASS BEADS

Thomas K. Wood, Devon Road, Essex Fells, N.J.

Filed Dec. 1, 1955, Ser. No. 550,249

3 Claims. (Cl. 49—58)

The present invention relates to apparatus for producing glass beads and constitutes an improvement over the apparatus described in U.S. Patents 2,334,578 granted November 16, 1943 and 2,619,776 granted December 2, 1952 to R.H. Potters. In such apparatus a vertically disposed draft tube or stack having a refractory coating on the inner surface and having a substantially open lower end is provided with one or more burners which form a flame inside the tube. Air enters the draft tube through the open lower end whereby an upward current of hot gases is formed in the draft tube. Particles of crushed glass are introduced into the draft tube and by careful selection of temperature, rate of upward flow of hot gases and particle size a very substantial portion of the glass particles will be carried upwardly through the draft tube to become sufficiently molten to assume spherical shape. As the molten droplets reach a cooler zone in the upper portion of the draft tube they will solidify in spherical shape and may be collected by effecting a change in velocity or direction or both of the gaseous stream in which the solidified spheres are suspended.

While, as indicated above, a very substantial portion of the glass particles are recovered in the form of spherical beads which are useful in many ways, including the manufacture of reflective paints or coatings, certain of the particles come into contact with the walls of the draft tube and of these particles some will tend to stick to the walls. Sticking is most likely to occur in the hottest region of the draft tube. It can be substantially reduced by the use of cooling ducts as disclosed in said Patent 2,334,578, for example. Nevertheless, some of the particles will stick and having stuck will increase likelihood of additional particles sticking. Eventually they form an accumulation which tends to become so thick as to require relatively frequent shutdown of the apparatus. On each shut-down it is necessary to chip the solidified glass coating from the inner surface of the draft tube and to replace the refractory coating.

In Patent 2,619,776 aforesaid, a power actuated hammer is provided to periodically deliver sharp blows to the exterior surface of the draft tube to dislodge the objectionable accumulation. As explained in said patent the particles which accumulate on the refractory coating form icicles of such weight as to overcome the strength of the refractory coating whereupon the icicles will fall, breaking away a portion of the coating. Hand hammering has been resorted to for dislodging accumulations before they build up to such thickness. With the automatic hammer provided in said patent the buildup of accumulated particles is delayed to such an extent that shutdown is required about every three to four hours. Hammering, whether manual or automatic, is quite noisy and, in some instances, may thus be objectionable to operating personnel or to the neighboring community.

The apparatus of the present invention is vastly superior to the hammering techniques of the past in that the build-up of accumulated glass icicles is so delayed as to require shut-down only after from six to eight hours of operation. Furthermore, the apparatus produces no noise comparable with hammering.

The present invention provides a vibrator such as the magnetic vibrators frequently used in conveying systems, which operates at a relatively high frequency to set the draft tube into vibratory motion during periods of use. While the hammering technique depends upon the accumulation of a certain amount of aggregated particles which are periodically knocked off as icicles of substantial size, the vibratory motion provided by the present invention appears to reduce the rate of accumulation of particles or at least reduce the rate of build-up. With the device of the present invention in operation a very large proportion of the aggregated particles fall through the open lower end of the draft tube in the form of icicles which are much smaller than those heretofore dislodged by hammering. The sharply reduced quantity of particles which do adhere to the wall will not build up to such thickness as to damage the refractory walls until the apparatus has been in operation for substantially twice the period of time heretofore possible.

It is an object of the present invention to provide apparatus for the manufacture of glass beads in which those portions of the apparatus on which accumulations of molten or semi-molten glass particles are likely to form are set into vibratory motion to sharply reduce the rate of formation of such accumulations. Other and further objects will become apparent from a consideration of the following detailed description of a preferred form of the present invention, taken in connection with the drawings forming a part of this specification.

In the drawings:

Fig. 1 is a view, with parts in section, of a glass bead forming device incorporating the present invention;

Fig. 2 is an enlarged, fragmentary elevation of a vibrator and structure for mounting the same on the draft tube of the device shown in Fig. 1;

Fig. 3 is a fragmentary plan view of the mounting structure shown in Fig. 2, on a slightly smaller scale than that used in Fig. 2; and Fig. 4 is a fragmentary elevation similar to but somewhat less enlarged than Fig. 3, and showing a modified form of mounting structure.

Referring now to the drawings, Fig. 1, the present invention is shown, for illustrative purposes, as embodied in apparatus otherwise substantially identical with that shown in Patent 2,334,578 aforesaid. For that reason the old parts of the apparatus will be but briefly described and reference is made to said Patent 2,334,578 for a detailed description of the construction and operation thereof. In said Fig. 1, a draft tube 10 is supported on a table 12 with the top of the draft tube open to the atmosphere and surrounded by a hopper 14 into which the formed glass beads may drop after being discharged from the upper end of draft tube 10. The draft tube is heated by a plurality of gas burners 16, for example, appropriately arranged and regulated to provide the temperature and clean combustion conditions required for forming crushed particles of glass into spherical bodies. The draft tube is provided with a draft regulator 18 and with cooling nozzles 20 which supply relatively cool air to the exterior of the hottest part of the tube walls to reduce sticking of particles and to prevent melting of the tube walls all as described in said Patent 2,334,578.

The interior of the draft tube 10 is coated with a refractory material 22 which serves various functions including protection of the metal tube walls from melting and prevention of the building up of such accumulations of adhered glass particles as would clog the draft tube. The latter function is achieved because, as accumulations of any substantial size build up upon the refractory coating, a portion of the coating will break away permitting icicles of accumulated glass to drop through the draft tube and out through the draft regulator 18. As stated in said Patent 2,334,578, the refractory coating may be applied as a wash of magnesite in a suitable liquid binder.

Glass particles ground to approximately the size desired in the finished beads are supplied to hoppers 24 to flow through lines 26 and nozzles 28 into the draft tube in a position above the level of the burners 16. The apparatus is so adjusted for any given size of particles as that the major percentage of particles of that size or smaller will reverse their direction of movement after they drop from the nozzles 28 to flow upwardly entrained in the hot gases in the draft tube 10. Such particles will be retained in the hot gases for a time long enough for them to soften and to assume a spherical shape whereupon they will flow out of the top of the draft tube to be collected in the hopper 14.

Oversize particles whether initially supplied or formed as the result of collisions between sticky particles entrained in the hot gases, will not flow out through the top of the draft-tube but will drop against the flow of hot gases and in some cases will come into contact with the refractory coating. Obviously, also some particles within the desired size range will come into contact with the refractory coating. In spite of cooling of the walls by nozzles 20, a portion of the particles which come into contact with the refractory coating will adhere thereto and will progressively build up a layer of sticky glass to which additional particles will even more readily adhere.

It has been customary in the past to dislodge accumulations of particles by relatively heavy hammer blows applied to the outside wall of the draft tube. Blows of sufficient strength to dislodge the particles endanger the refractory coating and it would not be expected that small amplitude vibrations would have any effect. Nevertheless, it has been discovered that setting the draft-tube into vibration at relatively high frequency and quite low amplitude is extraordinarily effective in encouraging the formation and release from the inner walls of a large number of relatively small icicles which cause remarkably small damage to the refractory coating. The reasons for such action are not understood but that it occurs is evidenced by the fact that the frequency of shut-downs is reduced by approximately one-half from that necessary even when automatic hammers as disclosed in Patent 2,619,776 are employed.

Suitable apparatus for vibrating the draft tube 10 is shown in Fig. 1 wherein a stand-off bracket 30 is secured to the draft tube 10 to support a magnetic vibrator 32 connected by wires 34 to a suitable source of electric power (not shown). In Figs. 2 and 3 the stand-off bracket 30 is shown as welded at 36 to the draft-tube 10 and it will be observed the bracket may be fabricated from angles to provide four legs for attachment to the draft-tube 10 and with upper and lower webs 38 and 40 to which a base plate 42 and the vibrator 32 may be secured as by cap screws 44. The legs of the stand-off bracket 30 form an open structure and are of such length as to permit circulation of air between the hot wall of the draft-tube 10 and the body of the vibrator 32. In this manner the vibrator 32 is protected from damage from heat. As a practical matter it has been found that if the legs of the bracket 30 are about six inches long the vibrator will be adequately protected. Obviously the stand-off bracket 30 should be very rigid in construction and rigidly secured to the draft-tube 10 so as to efficiently transmit energy from the vibrator 32 to the wall of the draft-tube.

The vibrator 32 may be any suitable, commercially available, unit having sufficient power to set the draft-tube 10 into vibration. For example, with apparatus of approximately the size of that disclosed in Patent 2,334,578 aforesaid, a commercial magnetic vibrator having an input of 175 watts (pulsating direct current) and vibrating at a frequency of 3600 c.p.m. has given excellent results. The vibrator chosen for illustrative purposes herein is similar in physical construction to that illustrated in Fig. 3 of U.S. Patent 2,322,864 granted July 6, 1943 to C. S. Weyandt. It is customary to supply pulsating direct current to the windings of such vibrators and it is understood that suitable apparatus (not shown) will be provided in the present invention. Such apparatus is commercially available and includes various controls for establishing the desired amplitude of vibration with maximum economy in power consumption.

The vibrator 32 includes an electro-magnet assembly 46 with core laminations 48 and an armature assembly 50. The latter includes laminations 52 secured to an intermediate portion of leaf springs 54, the outer ends of which are anchored to posts 56. The posts 56 are rigidly secured to the base plate 42. Forces developed by the vibrator 32 are thus transmitted lengthwise of the legs of bracket 30 to the wall of draft-tube 10. In the form of the invention shown in Figs. 1 through 3, the axis of vibration is normal to the axis of the cylindrical draft-tube 10 and thus is substantially normal to the exterior surface of the wall of the draft tube.

In some instances more efficient operation may be secured by arranging the axis of vibration at an angle other than 90° with the axis of the draft-tube whereby to produce a motion in the draft-tube wall which has a component parallel with the axis of the draft-tube 10. Thus in Fig. 4 a stand-off bracket 130 is shown which has one pair of legs shorter than the other and which is welded at 136 to the draft-tube 110 at an angle of approximately 45° with the axis thereof. A vibrator 132 is secured to the stand-off bracket 130 as described above in connection with Figs. 1 through 3. Forces developed by the vibrator 132 will be transmitted lengthwise of the legs of bracket 130 and thus imposed upon the wall of draft-tube 110 at an angle of about 45° with the axis of the draft-tube. The selection of the particular angle or direction of application of vibratory forces for maximum effect or efficiency, like the selection of amplitude, will be determined in any particular installation by the achievement of maximum operation periods between shut-downs.

Frequency and amplitude of vibration imparted to the draft tube for the purposes of this invention do not appear to be particularly critical and it is believed that those skilled in the art will have no difficulty in selecting proper values for a particular draft tube installation. The results of adjustment of amplitude are readily apparent in the size of the icicles discharged. As to frequency it is quite possible that selection of a frequency which coincides with resonant frequency of the structure would result in amplification of amplitude whereby adequate amplitude might be achieved with substantial economy in power consumed by the vibrator. In any event a frequency of at least several hundred cycles per minute is essential for the formation of satisfactorily small icicles. As a practical matter, economy suggests the use of a frequency of 3600 cycles per minute because that frequency can be produced from a standard 60 cycles per second source of alternating current with a minimum capital expenditure on mass-produced electro-magnetic equipment readily available in the market.

What is claimed is:

1. In apparatus for the manufacture of glass beads and the like the combination of a vertically disposed draft tube having an open lower end, means for supplying heat to the interior of said draft tube to cause an upward flow therein of hot gas at a temperature such as to soften small particles of glass, a coating of refractory material on at least the portion of the inner surface of said draft tube that is exposed to said glass-softening temperature, means for dispersing into said hot gas a continuous supply of finely divided glass particles a portion of which will flow upwardly with said hot gas to become spherical beads and a portion of which will come into contact with and tend to adhere to said refractory coating or glass particles previously adhered to said coating, and means for imparting vibratory driving motion to said draft tube and the refractory coating thereon at a constant frequency of at least several hundred cycles per minute, and, at a constant amplitude and in directions generally transverse to the longitudinal axis of said draft tube to minimize accumulation of adhered particles in a layer upon said refractory coating.

2. Apparatus as set forth in claim 1 wherein said means for imparting vibratory motion to said draft tube comprises an electro-magnetic vibrator and means for securing said vibrator to said draft tube.

3. Apparatus as set forth in claim 2 wherein said means for securing said vibrator to said draft tube comprises a metal frame having legs secured to said draft tube and extending generally radially thereof with said vibrator secured to the remote ends of said legs whereby to protect said vibrator from the high temperature imparted to said draft tube when said apparatus is in operation.

References Cited in the file of this patent

UNITED STATES PATENTS

| | | |
|---|---|---|
| 2,229,037 | Boldman | Jan. 21, 1941 |
| 2,334,578 | Potters | Nov. 16, 1943 |
| 2,572,484 | Howle et al. | Oct. 23, 1951 |
| 2,619,776 | Potters | Dec. 2, 1952 |